UNITED STATES PATENT OFFICE 2,071,452

LOW DIELECTRIC LOSS CERAMIC PRODUCT AND METHOD OF MAKING

Walter Bloch, Kidsgrove, Stoke-on-Trent, England

No Drawing. Application August 28, 1935, Serial No. 38,331. In Great Britain September 4, 1934

7 Claims. (Cl. 106—12)

This invention relates to a method of manufacturing densely sintered ceramic materials with low dielectric loss.

The development of electrotechnics and broadcasting, in particular, requires special materials, since the normal technical porcelains are not equal to the demands of the said modern arts. Porcelain is a mixture of quartz, feldspar and clay. The special materials referred to are without feldspar.

Feldspar has been known as an undesirable constituent for a long time already, especially on account of its high content of alkalis, and of the electric conductivity at higher temperatures.

This is the reason why other materials have been used for special purposes. Such materials may be silicates of magnesium, particularly talcum and magnesite whose properties are much more favorable, since they combined high mechanical and dielectric strength with high dielectric constant and low dielectric loss under high frequency.

However, the said materials or mixtures are very difficult to mold, even if finely ground, on account of their lack of plasticity.

The texture of these materials is not closed and they have a tendency to crack. Besides they do not sinter completely during the burning, which on the other side would easily occur in ceramic materials containing feldspar.

It is an object of the invention to provide an improved method for manufacturing densely sintered ceramic insulating materials with low dielectric loss. To this end, a densely sintering material is made of pulverized substances of the group of magnesium and titanium compounds, on the one hand, and of plastic substances containing alumina, on the other hand. In a substance of this kind, the magnesium or titanium compounds, or a mixture of such compounds, may amount to 80–97%, and the substance, or substances, containing alumina to 20–3%. However, the substance which contains the alumina, must have a comparatively low percentage of alumina. According to the invention, bentonite is used as the plastic substance. This is a silicate of aluminium which in pure condition contains 17% of $Al_2O_3$, giving a proportion of alumina in the total mixture from 3.4% to 0.5%. The percentage of $Al_2O_3$ in normal clay is 38%.

The two substances are worked into a plastic material from which bodies are made by pressing, stamping, jiggering, or other processes usual in the art of ceramics, and the bodies are then burned until completely sintered.

The invention is based on the surprising knowledge that a certain percentage of $Al_2O_3$ in such materials including magnesium and titanium compounds, or a mixture of both, is very desirable in order to obtain thorough sintering even at comparatively low temperatures, for example, 1250° C. for titanium compounds and 1300° C. for magnesium compounds while, on the other hand, the percentage of alumina should be low, and the newly molded bodies must have a dense texture. This object is achieved by using bentonite, or mixtures of bentonite and clays, particularly fat clays, because by these expedients the molding is greatly facilitated, the formation of cracks is prevented, a dense texture is obtained, and the material is not subjected to melting or deformation during burning.

With respect to their texture, the novel materials are by no means inferior to the dense materials sintered with feldspar, but compare favorably with these, since they have a very low angle of dielectric loss under high frequency.

The magnesium compounds to be used for the present invention are first and foremost natural or artificial magnesium silicates, and particularly talcum. However, other magnesium compounds, such as magnesite, forsterite, periclase, magnesium hydroxide, or similar minerals, may be used as the crude substance. Artificial magnesium compounds may be made by fritting or fusing and subsequent fine grinding. A suitable titanium compound is the mineral known as rutil. However, titanates, i. e., artificial compounds obtained by fritting or fusing of rutil with earth alkalis, or magnesia, and finely ground, are particularly favorable for the present invention.

Various bentonites are available, but sodium bentonite is preferred. If calcium bentonites are present, it may be desirable under certain conditions to convert them into sodium bentonites by treatment with sodium compounds.

The compounds of magnesium and/or titanium may be replaced partly by substances of other kind, for instance by quartz, zirconium oxide, zirconium earth, zirconium, oxide of cerium, beryllium, zinc oxide, baryta, etc. Earth alkali compounds, i. e., compounds of calcium, strontium, barium, or the like, particularly phosphates, such as bone ash, apatite, and the like may also be used. The amount to which the said substances may replace the magnesium or titanium compounds, may be 50%, and more. Very favorable results have been obtained by replacing 10–15% of the magnesium or titanium compounds. By adding the said substances, the materials are principally improved with respect to burning.

The percentage of bentonite is determined by the purpose for which the ceramic material is to be used, i. e., whether it is to be molded under pressure, jiggered or cast. In most cases, the upper limit of the percentage of bentonite is 5%.

If, for particular purposes, the material must be very resistant against temperature variations, a certain portion of the mixture may be burned and granular ground fragments of suitable grain size and of the same composition as the other portion of the mixture.

It is also possible to add a granular substance which is of a composition altogether different from that of the material provided the dielectric constant of the added substance is high enough.

The densely sintered magnesium and/or titanium compound mixtures are very dense ceramic insulating materials of very low dielectric loss, and particularly suited for use in broadcasting.

I claim:

1. The method of manufacturing densely sintered ceramic insulating materials with low dielectric loss, comprising mixing from 80% to 97% of a pulverulent, nonplastic material consisting principally of a substance selected from the group consisting of magnesium and titanium compounds, and from 20% to 3% of an alumina containing material comprising bentonite, the proportion of alumina in the mixture not exceeding that which is contained in the maximum proportion of bentonite, shaping the mixture into bodies, and burning the bodies at sintering temperature.

2. The method of manufacturing densely sintered ceramic insulating materials with low dielectric loss, comprising mixing from 80% to 97% of a pulverulent, nonplastic material consisting principally of a substance selected from the group consisting of magnesium compounds, and from 20% to 3% of an alumina containing material comprising bentonite, the proportion of alumina in the mixture not exceeding that which is contained in the maximum proportion of bentonite, shaping the mixture into bodies, and burning the bodies at sintering temperature.

3. The method of manufacturing densely sintered ceramic insulating materials with low dielectric loss, comprising mixing from 80% to 97% of a pulverulent, nonplastic material consisting principally of a substance selected from the group consisting of titanium compounds, and from 20% to 3% of an alumina containing material comprising bentonite, the proportion of alumina in the mixture not exceeding that which is contained in the maximum proportion of bentonite, shaping the mixture into bodies, and burning the bodies at sintering temperature.

4. The method of manufacturing densely sintered ceramic insulating materials with low dielectric loss, comprising mixing from 80% to 97% of a pulverulent, nonplastic material consisting principally of a substance selected from the group consisting of magnesium and titanium compounds, and from 20% to 3% of an alumina containing material comprising bentonite and clay, the proportion of alumina in the mixture not exceeding that which is contained in the maximum proportion of bentonite alone, shaping the mixture into bodies, and burning the bodies at sintering temperature.

5. The method of manufacturing densely sintered ceramic insulating materials with low dielectric loss, comprising mixing from 80% to 97% of a pulverulent, nonplastic material consisting substantially of magnesium silicate, and from 20% to 3% of an alumina containing material of the group consisting of bentonite and bentonite and clay, the total proportion of the alumina in the mixture not exceeding substantially 3.4% of the total mixture, shaping the mixture into bodies, and burning the bodies at sintering temperature.

6. A densely sintered ceramic insulating body composed of a mixture of from 80% to 97% of nonplastic material consisting principally of a substance selected from the group consisting of magnesium and titanium compounds, and 20% to 3% of an alumina containing material comprising bentonite, the proportion of the alumina in the whole mixture not exceeding that which is contained in the maximum proportion of bentonite, said body having a high dielectric constant.

7. A densely sintered ceramic insulating body composed of a mixture of from 80% to 97% of nonplastic material consisting substantially of magnesium silicate and 20% to 3% of an alumina containing material of the group consisting of bentonite and bentonite and clay, the proportion of alumina in the mixture not exceeding substantially 3.4% of the total mixture, said body having a high dielectric constant.

WALTER BLOCH.